United States Patent [19]

Stenzel et al.

[11] Patent Number: 5,391,266
[45] Date of Patent: Feb. 21, 1995

[54] METHOD OF REGULATING THE THROUGHPUT IN THE ELECTROCHEMICAL REGENERATION OF CHROMOSULFURIC ACID

[75] Inventors: Jürgen Stenzel, Gersthofen; Hans Herbst, Meitingen, both of Germany

[73] Assignee: Hoechst Aktiengesellschaft, Frankfurt, Germany

[21] Appl. No.: 945,986
[22] PCT Filed: May 3, 1991
[86] PCT No.: PCT/EP91/00842
§ 371 Date: Nov. 3, 1992
§ 102(e) Date: Nov. 3, 1992
[87] PCT Pub. No.: WO91/17117
PCT Pub. Date: Nov. 14, 1991

[30] Foreign Application Priority Data

May 5, 1990 [DE] Germany ............... 4014429

[51] Int. Cl.$^6$ ............................................. C25B 1/22
[52] U.S. Cl. ............................................. 204/97
[58] Field of Search ............... 204/89, 97, 263, 130

[56] References Cited

U.S. PATENT DOCUMENTS

| 3,423,300 | 1/1969 | Joo et al. | 204/89 |
| 3,450,623 | 6/1969 | Joo et al. | 204/256 |
| 3,595,765 | 7/1971 | Joo et al. | 204/89 |
| 3,761,369 | 9/1973 | Tirrell | 204/151 |
| 3,909,381 | 9/1975 | Ehrsam | 204/180 P |
| 4,031,001 | 6/1977 | Bosa | 204/257 |
| 4,557,811 | 12/1985 | Furst et al. | 204/105 R |

FOREIGN PATENT DOCUMENTS 583202 12/1977 U.S.S.R.
757607 8/1980 U.S.S.R.

OTHER PUBLICATIONS

Chemical Abstracts, Band 84, No. 10, Mar. 8, 1976, p. 513, Zusammenfassung Nr. 66896n, E. S. Letskikh et al.: "Electrochemical regeneration of chromium sulfate waste during oxidation (purification) of mineral was", & Khim. Tverd. Topl, 1976.
Chemical Abstracts, Band 87, No. 26, Dec. 26, 1977, p. 450, Zusammenfassung Nr. 208652t; & SU-A-574 482 (E. S. Letskikh et al.), Sep. 30, 1977.

Primary Examiner—John Niebling
Assistant Examiner—Brendan Mee
Attorney, Agent, or Firm—Connolly & Hutz

[57] ABSTRACT

In the electrochemical regeneration of chromosulfuric acid, the chromium (III) sulfate solution containing sulfuric acid is fed under pressure into the electrolysis cells. In this way malfunctions in production are reduced. Variations in the amount of electric current available can be absorbed flexibly. The chromosulfuric acid is produced with constant quality.

13 Claims, No Drawings

METHOD OF REGULATING THE THROUGHPUT IN THE ELECTROCHEMICAL REGENERATION OF CHROMOSULFURIC ACID

BACKGROUND OF THE INVENTION

1. Field of the Invention

The invention relates to a method of regulating the throughput in the electrochemical regeneration of chromosulfuric acid by the metered addition of hot chromium (III) sulfate solution containing sulfuric acid in continuously operated flow-type electrolysis cells.

2. Description of the Prior Art

It is known to convey the hot solution (hot chromium (III) sulfate solution), into stock containers disposed in an elevated position and to feed the electrolyte to the individual cell cascades from said stock containers by means of glass siphons and long flexible pipes. (cf. M. Käppel, Elektrolytische Regeneration von Chromsäure [Electrolytic Regeneration of Chromic Acid], Chem. Ing. Technik 35 (1963), 386–389). Said siphons are glass tubes bent in a U-shape and having an elongated limb which terminates with a capillary-type tapering of the glass tube diameter. The amount of liquid flowing through is dependent on the difference in height between the liquid level in the stock vessels and the end of the longer limb of the glass siphon, and also on the diameter of the capillary. If it is intended to alter the amount of liquid, the glass siphons have to be replaced by others having greater capillary diameter (for more passage of liquid) or smaller capillary diameter (for less passage of liquid).

This type of metered addition has a number of disadvantages:

1. The stock containers storing the hot chromium (III) sulfate solution containing sulfuric acid are an accident risk in the event of leakages.
2. The chromium (III) sulfate solution containing sulfuric acid has to be fed to the electrolyte cells via long flexible pipes. Owing to entrained air and evolving gases, the flexible pipes have to be degassed in a suitable way. In addition, the gases can result in the breakdown of the liquid column in the glass siphon.
3. If the amount of electric current available changes, the amount of electrolyte to be fed through has to be adapted by replacing the glass siphon. That requires some time and results in defects in the quality of the regenerated chromosulfuric acid.
4. The hot chromium (III) sulfate solution containing sulfuric acid arriving from the montan wax bleaching often contains traces of wax which has not been separated off. Since the working temperature of the electrochemical regeneration (less than 100° C.) is below the melting point of the wax, wax may deposit in the glass siphons and, in particular, in the capillaries of the glass siphons. This alters the diameter of the glass tubes and the amount of liquid flowing through, and consequently the quality of the final product (constant changes in concentration).

SUMMARY OF THE INVENTION

A process is furthermore known for the electrolytic regeneration of reduced chromium compounds in which the solution of the chromium compound to be regenerated is introduced continuously into the cathode chamber of an electrolytic cell containing a porous polytetrahaloethylene diaphragm, and is passed into the anode chamber through at least one opening in the diaphragm, and, after anodic oxidation of the chromium compound, the regenerated solution is removed from the anode chamber of the cell (cf. DE-A-1804956). The process operates virtually without pressure and has similar problems as described above.

There was therefore the object of finding a method which does not have the above defects.

It was found that the object can be achieved if the chromium (III) sulfate solution containing sulfuric acid is fed in under pressure, the amount of electrolyte fed in making it possible to produce a uniform product quality by controlling regulation.

The invention consequently relates to a method of regulating the throughput in the electrochemical regeneration of chromosulfuric acid by continuously feeding chromium (III) sulfate solution containing sulfuric acid to the electrolysis cells, comprising keeping the chromium (III) sulfate solution containing sulfuric acid under pressure in a closed pipe system and passing it through replaceable orifices in the cell feed lines into the anode chamber of the first cell in each case of a cell cascade, the amount of electrolyte fed into the cells being controlled via the pressure in the pipe system and the diameter of the opening in the orifices, and the level in the acid collecting container serving as the regulating quantity for the inlet pressure of the electrolyte feed.

The method according to the invention is preferably used in the regeneration of chromosulfuric acid which is used for bleaching crude montan wax. This regeneration has been known for many years.

DESCRIPTION OF THE PREFERRED EMBODIMENT

The invention consequently relates to a method of regulating the throughput in the electrochemical regeneration of chromosulfuric acid by continuously feeding chromium (III) sulfate solution containing sulfuric acid to the electrolysis cells, comprising keeping the chromium (III) sulfate solution containing sulfuric acid under pressure in a closed pipe system and adjusting the pressure to match the electrolyte consumption of the electrolysis cells.

In the refinement of montan wax, molten crude montan wax continuously makes thorough contact in cocurrent with hot chromosulfuric acid. In this process, the dark substances in the wax are oxidatively destroyed by the powerful oxidizing agent chromosulfuric acid; the wax is bleached. In the oxidation of the organic dark substances in the crude montan wax with the chromium trioxide of the chromosulfuric acid, the hexavalent chromium is reduced to trivalent chromium. To operate the continuous montan wax bleaching, chromosulfuric acid of constant quality (amount, concentration, temperature) is required.

After replacing evaporated water, the hot chromium (III) sulfate solution containing sulfuric acid is transferred to a buffer container from which it is continually removed and pumped into a chemically resistant, closed pipe system made of steel/PTFE. A constant adjustable pressure of 0.1 to 5, preferably 0.7 to 1.5, bar is maintained in the pipe system. From said pipe system, the chromium (III) sulfate solution containing sulfuric acid is fed via short, electrically non-conducting, chemically resistant plastic feed lines (preferably made of PVDF) through replaceable orifices made of zirconium metal into the anode chamber of the first cell in each case of a cell cascade. The diameter of the opening in the zirconium orifices is 0.1 to 15.0 mm, preferably 3 to 6 mm. The amount of electrolyte fed in depends on the pressure in the pipe system and the diameter of the opening in the zirconium orifices.

The concentration and amount of the chromosulfuric acid. produced are determined at the discharge from the cascade.

According to the method, the level in the acid collecting container is chosen as the regulating quantity for the inlet pressure of the electrolyte feed. In the case of normal operation, the level remains constant because the amount of acid flowing in from the cascade discharges and the amount delivered from the acid collection container to the montan wax plant are equal. In the event of malfunctions or deliberate changes, the level in the acid collection container will change as a result of greater or lesser amount of acid flowing in, with an unaltered delivery to the wax plant. An altered level in the acid collection container acts as a regulating quantity on the pressure of the electrolyte pressure feed (e.g. low level causes higher pressure in the pressure of the electrolyte feed).

The method according to the invention yields a number of advantages as 1. the pipeline system is laid outside the workplaces, namely below the platform of the electrolysis cell shop;
2. the electrolyte is fed into the liquid of the electrolysis cell without bubbles; there are no longer emissions in the working area;
3. the pressurized electrolyte passes through the opening of the zirconium orifice at high velocity (turbulently). The encrustation of said opening due to solidifying wax hardly takes place any longer (in contrast to this, the capillary of the glass siphon through whose opening the liquid flowed comparatively slowly (laminarly) became encrusted).
4. The slight variations in the amounts of electrolyte fed into the cascades result in slight variations in concentration in the final product if the amount of electrolysis current is constant.

In addition, the method according to the invention is capable of adaptation so that even short-term changes in the amount of electric current can be absorbed flexibly without the quality of the final product being affected.

Thus, in the event of a sudden reduction in the amount of electric current to 50%, the pressure in the pipe system is also reduced by about 50% by adjustment of the pressure preselection in the measuring station. (Response time approximately 30 seconds.) If the amount of flow increases, the same simple intervention takes place in the reverse direction.

The chromic acid plant can consequently respond flexibly and without quality losses to variations in the supply of electrolytic current.

Furthermore, the method according to the invention also succeeds in absorbing, smoothing out or compensating for variations in the amount of product due to the system and consequently arriving at a uniform product and, consequently, better quality. Such variations in the amount of chromosulfuric acid leaving the end of the cascade may be due to a) changes in the viscosity of the electrolyte corresponding to the variations in the density,
b) changes in the viscosity of the electrolyte corresponding to variations in the electrolysis temperature,
c) encrustations of the orifice opening of the zirconium orifice due to depositions of wax, resin and/or gypsum,
d) blockages in the overflows from diaphragm pocket to diaphragm pocket within a cell,
e) blockages in the overflows from cell to cell within a cascade.

The method according to the invention is capable of absorbing and smoothing out the abovementioned disturbing effects by means of automatic regulation by slight changes in the inlet pressure in the pressurized electrolyte line and of producing chromosulfuric acid in the desired amount of uniform quality.

Comparison Example A (Normal Operation)

In the high building of the cell shop, 108 glass siphons were in operation and through them the mixed acid was fed in hoses to the 54 cascades and fed in each case into the anode space of the first cell.

All 54 cascade discharges were checked analytically at least once a day (titration).

Concentration specification 98 g $CrO_3/l$ ±3 g $CrO_3/l$

The discharge of the last of the 11 cells of a selected cascade indicated

| at 8.00 on Monday | 100 g of $CrO_3/l$ |
| at 8.00 on Tuesday | 102 g of $CrO_3/l$ |
| at 8.00 on Wednesday | 97 g of $CrO_3/l$ |
| at 8.00 on Thursday | 95 g of $CrO_3/l$ |
| at 8.00 on Friday | 92 g of $CrO_3/l$ |

This was followed on Friday by the instruction to look for a fault in this cascade (11 cells each containing 20 diaphragm pockets) and to change the acid siphon.

It was not possible to find any fault. The "5.6" (capillary diameter ) glass siphon was replaced by a "5.2" glass siphon.

| At 8.00 on Saturday | 96 g of $CrO_3/l$ |
| at 8.00 on Sunday | 97 g of $CrO_3/l$ |

The other 53 cascades had to be looked after in the same way.

COMPARISON EXAMPLE B (Fault Condition)

In the high building of the cell shop, 108 glass siphons were in operation.

The electric power center reported that the electrolysis current had to be reduced by 20% for approximately 3 h.

In accordance with its buffer volume, the output of the chromic acid plant had to be throttled back by 20% in 3 h.

In the measuring station, a list of discharge concentrations and the calculated reduced electric current feed were used to prescribe which acid siphons had to be replaced. The siphons were replaced on the basis of the list (approximately 30 siphons/h).

In the measuring station, the electric current consumption was reduced.

After 3 h the operation was carried out in the reverse direction.

In the course of approximately 2 h, the acid delivered to the wax =plant had decreased in amount by approximately 20% and then increased again. In the course of the subsequent 24 h after the above fault its concentration had fallen from 98 g of $CrO_3/l$ to 92 g of $CrO_3/l$, risen to 102 g of $CrO_3/l$ and then balance out at 97 g of $CrO_3/l$.

EXAMPLE 1

The pressurized electrolyte line laid beneath the cell shop fed mixed acid, which was fed into the anode space above zirconium orifices through short tap lines to each of the 54 cascade beginnings.

All the cascade discharges were checked analytically once a day (automatic titration system with a sample changer). Concentration specification (97 g of $CrO_3/l$ ±2 g of $CrO_3/l$)

The discharge of a selected cascade indicated the following titration results:

| | |
|---|---|
| at 8.00 on Monday | 98.1 g of $CrO_3/l$ |
| at 8.00 on Tuesday | 97.6 g of $CrO_3/l$ |
| at 8.00 on Wednesday | 96.7 g of $CrO_3/l$ |
| at 8.00 on Thursday | 97.2 g of $CrO_3/l$ |
| at 8.00 on Friday | 97.5 g of $CrO_3/l$ |
| at 8.00 on Saturday | 96.8 g of $CrO_3/l$ |
| at 8.00 on Sunday | 96.2 g of $CrO_3/l$ |
| at 8.00 on Monday | 95.9 g of $CrO_3/l$ |
| at 8.00 on Tuesday | 96.3 g of $CrO_3/l$ |
| at 8.00 on Wednesday | 95.2 g of $CrO_3/l$ |
| at 8.00 on Thursday | 95.6 g of $CrO_3/l$ |
| at 8.00 on Friday | 94.3 g of $CrO_3/l$ |

There then followed on Friday the instruction to look for a fault in this cascade and if necessary to change the zirconium orifice. It was not possible to find any fault. The "3.8" zirconium orifice was replaced by a "3.7" zirconium orifice.

| The results of the subsequent period were: | |
|---|---|
| at 8.00 on Saturday | 96.2 g of $CrO_3/l$ |
| at 8.00 on Sunday | 96.8 g of $CrO_3/l$ |
| at 8.00 on Monday | 96.2 g of $CrO_3/l$ |
| at 8.00 on Tuesday | 96.9 g of $CrO_3/l$ |
| at 8.00 on Wednesday | 97.8 g of $CrO_3/l$ |

EXAMPLE 2

(Fault Condition)

54 cascades were connected to the pressurized electrolyte feed in the cell shop.

The electric power center reported that the electrolysis current was being reduced by 20% for approximately 3 h.

1) In the measurement station, the electric current consumption was throttled back by 20%.
2) Furthermore, the set point value of the amount of acid to be delivered was reduced by 20%.
3) In addition, the set point value of the pressure in the pressurized electrolyte feed was reduced by 20%. Time requirement 1-3 minutes.

3 h after the elimination of the fault source in the electric power center, the above changes were reversed. Time requirement 1-3 minutes.

The amount delivered to the wax plant was reduced by 20% for 3 h. The concentration of acid had not at any time exceeded the specification limit of 97 g of $CrO_3/l$ ±2 g.

What is claimed is:

1. A method of regulating the throughput in the electrolytic regeneration of chromosulfuric acid by continuously feeding chromium (III) sulfate solution containing sulfuric acid to the electrolysis cells, said cells having anode chambers and being arranged in cascades, the regenerated chromosulfuric acid being collected in an acid-collecting container, said method comprising;

keeping the chromium (III) sulfate solution containing sulfuric acid under pressure in a closed pipe system and passing it through a replaceable orifice in a cell feed line into the anode chamber of the first cell of each cascade, the amount of electrolyte fed into the cells being controlled via the pressure in the pipe system and the diameter of the opening in the orifices, and the level in the acid collecting container serving as the regulating quantity for the inlet pressure of the electrolyte feed and wherein the chromium (III) sulfate solution containing sulfuric acid is obtained from the bleaching of montan wax with chromosulfuric acid.

2. The method as claimed in claim 1, wherein said pressure is 0.1 to 5.0 bar.

3. The method as claimed in claim 1, wherein said pressure is 0.7 to 1.5 bar.

4. The method as claimed in claim 3, wherein said orifice is made of zirconium metal.

5. The method as claimed in claim 4, wherein said feed line being made of a non-conducting, chemically-resistant plastic.

6. The method as claimed in claim 5, wherein said non-conducting, chemically-resistant plastic is PVDF.

7. The method as claimed in claim 6, wherein the diameter of the opening in the orifice is from 3 to 6 mm.

8. The method as claimed in claim 1, wherein said orifice is made of zirconium metal.

9. The method as claimed in claim 1, wherein said feed line being made of a non-conducting, chemically-resistant plastic.

10. The method as claimed in claim 9, wherein said non-conducting, chemically-resistant plastic is PVDF.

11. The method as claimed in claim 1, wherein the diameter of the opening in the orifice is from 0.1 to 15.0 mm.

12. The method according to claim 1, wherein said electrolyte is fed into the liquid of the electrolysis cell without bubbles.

13. The method as claimed in claim 1, wherein the amounts of the electrolyte fed into the cascades results in slight variations in concentration in the final product when the amount of electrolysis current is constant.

* * * * *